Patented Nov. 10, 1925.

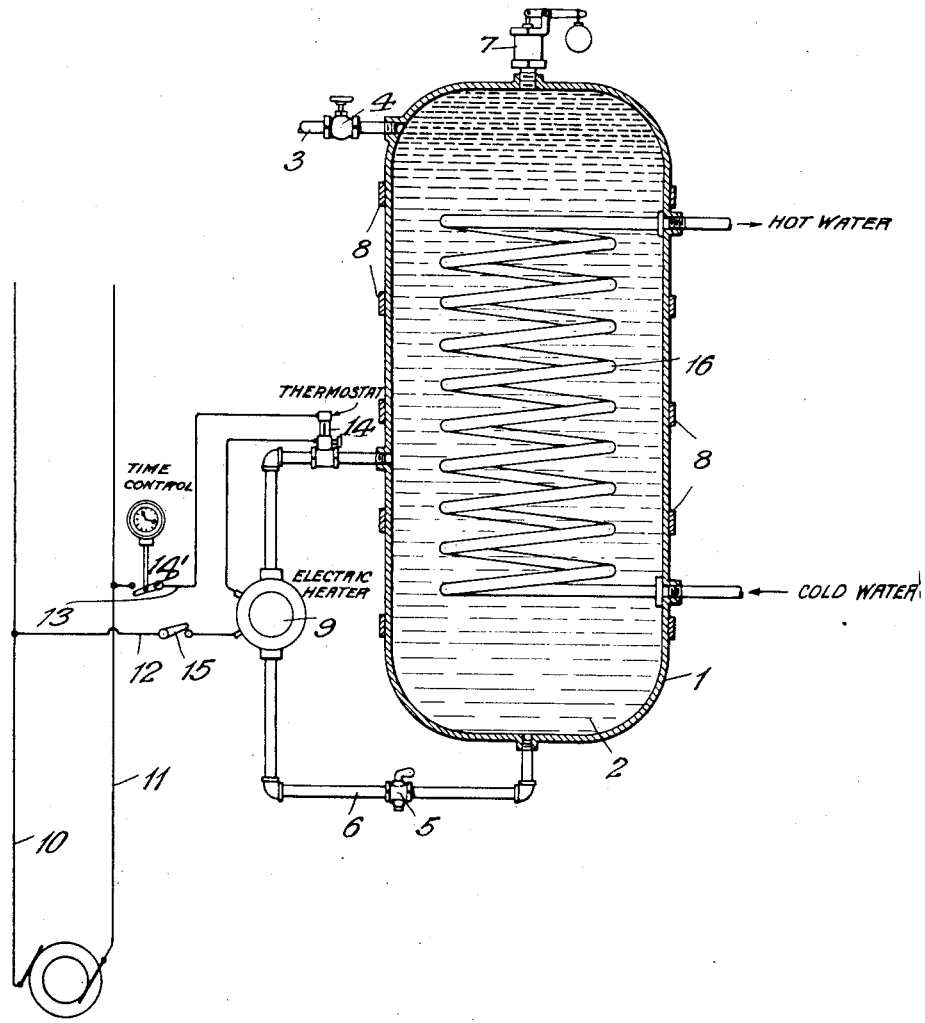

1,560,528

UNITED STATES PATENT OFFICE.

FRANK GEORGE BAUM, OF SAN FRANCISCO, CALIFORNIA.

HOT-WATER HEATING SYSTEM.

Application filed April 25, 1924. Serial No. 708,890.

*To all whom it may concern:*

Be it known that I, FRANK G. BAUM, a citizen of the United States, residing at San Francisco, in the county of San Francisco and State of California, have invented certain new and useful Improvements in Hot-Water Heating Systems, of which the following is a full, clear, and exact description.

My invention has to do with the proper relating of the consumption of electric current or gas for the heating of water with the daily and seasonal power loads on systems of public service companies engaged in the supplying of heating, lighting and power media for public consumption. While my invention is applicable to the systems of either gas or electric companies, I shall, for the sake of simplicity, confine my description thereof to its adaptation for use in electrical supply systems.

In practically all power systems which supply electrical current for public use, the load or demand upon the system varies greatly with different times of the day and with different seasons of the year. It is desirable that the unnecessary demand for current be minimized during the period of peak loads, and effort is constantly made by such companies to encourage the consuming public so far as possible in the use of current for domestic and similar purposes during the off-peak periods.

While the power companies supplying electrical current have been striving to stimulate the use of electricity for cooking purposes, the adoption of electrical cooking ranges has been hampered by the fact that there has been no practical system devised for the heating of water by electricity which would not be relatively expensive and which would not tend to increase the demand for electric current during all periods of the day including the high peak periods. It is a recognized fact that an innovation for cooking purposes cannot progress any faster with respect to its commercial adoption than the same innovation is rendered available for water heating purposes. The history of the adoption of gas for cooking purposes proved this, and now those connected with electrical power companies are meeting with the same experience in connection with the adoption of electricity for cooking purposes. The need of a system for water heating which will create a demand upon the supply and power companies for this purpose only during the off-peak periods, has long been appreciated, and power companies generally have encouraged the use of their product during off-peak periods by making a differential in price favorable to those periods.

This does not solve the problem, however, for many purposes, such for instance, as the heating of water for domestic purposes, since the demand for hot water is not confined to any particular period of the day.

I have solved this problem by providing a system in which the supply of gas or electric current for such purposes as the heating of hot water for domestic use is automatically confined to the off-peak periods, and during those periods is utilized to store up sufficient heat in a heat absorbing body to heat all the water which will be used during and between the periods when the gas or electric current is being supplied for the purpose. The continuation of the use of the current or gas during the period when it is available is controlled by the amount of heat absorbed or stored, thereby limiting the consumption in accordance with the needs.

More particularly, my system comprehends a closed tank containing a heat storage liquid, such as water, and the heater to which the gas or electric current is supplied is properly associated with this tank so as to heat the water contained therein. Since the tank is closed, the water can be heated to any temperature compatable with the strength of the tank. A water heater, such as coils, are contained in this tank within the body of liquid, one end of the coils being connected externally of the tank to the source of water supply, and the other end being connected to the domestic hot water system or other place for utilization. The heat stored in the liquid in the tank will be transferred to the water in the coils and either steam or hot water as desired, will be drawn from the coil. The tank is made of such size and strength as to permit of the storage of the desired amount of heat in the heat absorbing liquid. For the sake of economy a suitable device responsive to the amount of heat stored in the liquid operates to cut off the current or gas supply when the maximum desired temperature or pressure is obtained.

A relief valve will probably be provided for the tank. A time control switch, either at the power house or at the place of use of the current, will operate to confine the supply to the off-peak periods.

In the drawing I have shown diagrammatically a system embodying my invention as adapted to electrical power systems. I shall now describe this illustrated embodiment of my invention and shall thereafter point out my invention in claims.

The tank 1 contains the heat storing liquid 2, such as water. An inlet pipe 3 controlled by a valve 4 serves to admit the water to the tank, while the water may be drawn off through a drain cock 5 in the circulatory pipe 6. The size of the tank 1 will be determined by the demand upon it. The tank is closed except for a relief valve 7, and due to this fact the water may be raised to any temperature within the limits of the operation of the relief valve and of a thermostatic control hereinafter referred to. The tank is made sufficiently strong to withstand the relatively high pressures, this fact being indicated in the illustration by reinforcing bands 8 about the tank. If desired, the tank may be made of relatively thick steel without reinforcing bands. A suitable heat-insulating covering for the tank will be provided to minimize the loss by radiation of the heat units stored in the water.

In the illustrated embodiment the heat will be supplied by an electric heater 9 disposed in the conduit 6. This is connected across the electric mains 10 and 11 by leads 12 and 13. In the lead 13 is a switch controlled by a thermostat 14 responsive to the temperature of the water 2. A pressure operated regulator would be an equivalent.

Also properly related to the main circuit is a time-controlled switch 14' which will be open during the peak load periods and closed during the off-peak periods. Also a manual switch 15 will be provided at the place of use, in order to make it optional with the customer whether he be using the current even during the off-peak periods.

The heat will be extracted from the water by means of water circulated through the reservoir 16, shown as coils, within the tank. The cold water from the main enters at one end of the coils and emerges as hot water or steam from the other end, from where it will be conducted to the hot water system, or to a mixing valve or point of utilization.

It will be observed that in this way hot water or steam can be made instantly available at any time of the day or night by temporary use of the off-peak current, and that the amount of heat stored may be regulated according to the adjustment of the thermostat, and that the thermostat and time control switch cooperate to confine both the time and quantity of current consumption to the desired limits.

It is obvious that various modifications may be made in the construction shown in the drawing and above particularly described within the principle and scope of my invention.

I claim:

1. A water heating system comprising a relatively strong closed tank for containing a heat storage liquid, a heating element associated with said tank including a conductor for a heat-generating medium in communication therewith, two automatic devices for controlling the passage of said medium in said conductor, one being time-controlled and the other being responsive to the temperature of said liquid in the tank, and a water coil heater within the tank and communicating with inlet and outlet conduits external of the tank.

2. A water heating system comprising a relatively strong closed tank for containing a heat storage and a short external circulatory conduit communicating therewith at points near the bottom and at a higher level, a heating element in said conduit, a conductor for a heat-generating medium in communication with the heating element, a controlling device for said conductor responsive to the temperature of said liquid, and a water coil heater within the tank and communicating with inlet and outlet conduits external of the tank.

3. A water heating system comprising a relatively strong closed tank for containing a heat storage liquid and a short external circulatory conduit communicating therewith at points near the bottom and at a higher level, a heating element in said conduit, a conductor for a heat-generating medium in communication with the heating element, two automatic devices for controlling the passage of said medium in said conductor, one being time-controlled and the other being responsive to the temperature of said liquid in the tank, and a water coil heater within the tank and communicating with inlet and outlet conduits external of the tank.

4. The method of heating water from a source of heating medium subject to variable load conditions consisting in automatically controlling the said medium so as to render it available only during periods of low load, utilizing the said medium during said available periods to store heat in a heat-absorbing body, automatically limiting the delivery of heating medium to said body in accordance with the heat absorbed by said body, and extracting the heat from said body to heat water or other liquid as desired.

In witness whereof, I hereunto subscribe my signature.

FRANK GEORGE BAUM.